Feb. 23, 1943.     H. W. ADAMS     2,311,920
ANIMAL TRAP
Original Filed Feb. 13, 1941     2 Sheets-Sheet 1

Inventor
Hubert W. Adams

By *Clarence A. O'Brien*

Attorney

Feb. 23, 1943.   H. W. ADAMS   2,311,920
ANIMAL TRAP
Original Filed Feb. 13, 1941   2 Sheets-Sheet 2
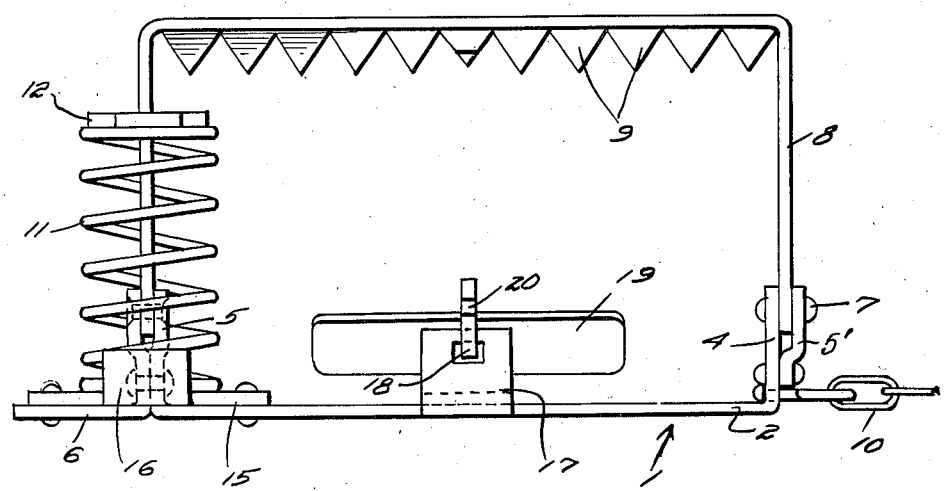
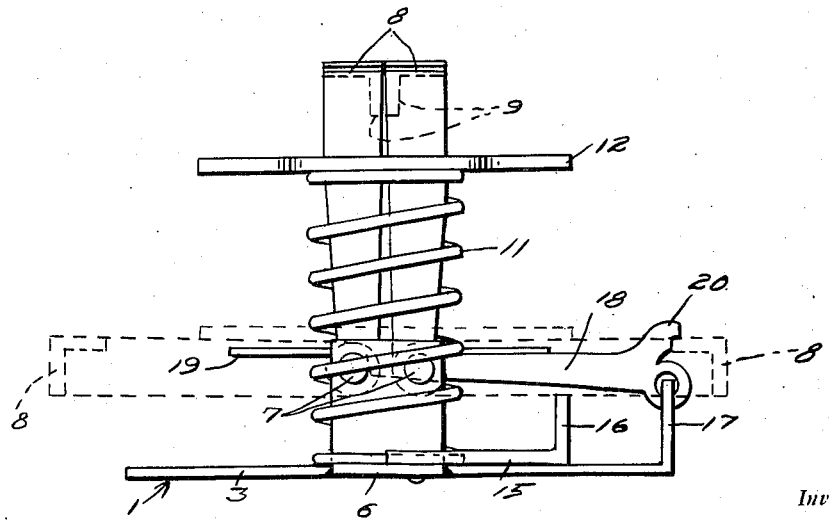
Inventor
Hubert W. Adams
By *Clarence A. O'Brien*
Attorney Patented Feb. 23, 1943

2,311,920

UNITED STATES PATENT OFFICE 2,311,920

ANIMAL TRAP

Hubert W. Adams, Charleston, Ill., assignor of one-third to Walter M. Briggs, Charleston, Ill.

Substituted for abandoned application Serial No. 378,797, February 13, 1941. This application January 17, 1942, Serial No. 427,190

1 Claim. (Cl. 43—88)

The present is in substitution for application Serial No. 378,797, filed February 13, 1941, and relates to new and useful improvements in animal traps of the pivoted coacting jaw type and has for one of its important objects to provide, in a manner as hereinafter set forth, a device of this character comprising unique means for instantly and positively closing the jaws when said jaws are released.

Another very important object of the invention is to provide an animal trap of the aforementioned character comprising jaws of novel construction whereby the animal, when it has been caught, will be prevented from escaping.

Still another important object of the invention is to provide a trap of the character described which embodies novel means for facilitating opening or spreading the jaws for setting the trap.

Other objects of the invention are to provide an animal trap of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in side elevation of the trap, showing the jaws closed.

Figure 3 is a view in end elevation of the device.

Figure 1:
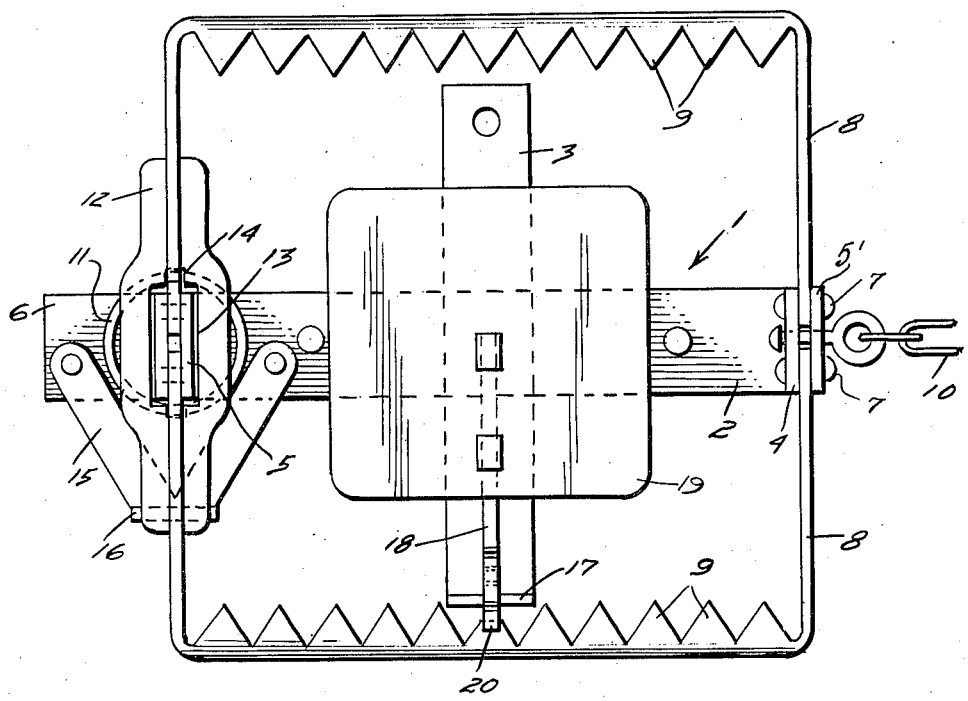
Figure 1 is a top plan view of an animal trap constructed in accordance with the present invention, showing said trap set or open.
Figure 4:
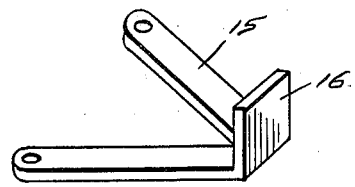
Figure 4 is a detail view in perspective of the setting bar rest.
Figure 5:
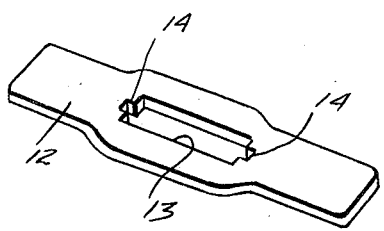
Figure 5 is a detail view in perspective of the setting bar.

Referring now to the drawings in detail, it will be seen that the embodiment of the invention which has been illustrated comprises a frame or base which is designated generally by the numeral 1. The base 1 includes comparatively long and short crossed bars 2 and 3, respectively, of suitable metal. The bar 2 terminates in upturned end portions 4 and 5. Mounted on the end portion 5 of the bar 2 is an L-shaped extension 6, a portion of which cooperates with the end portion 5 of the bar 2 in pivotally supporting jaws 8. The end portion 4 of the bar 2 has a plate 5' secured thereto to coact therewith in pivotally supporting the jaws 8.

Pivotally mounted at 7 on the upturned end portions 4 and 5 and the coacting members 5' and 6 of the bar 2 is a pair of substantially U-shaped, coacting jaws 8. Projecting angularly from the bight or intermediate portions of the jaws 8 are teeth 9. A suitable anchoring chain 10 is swivelly connected to the end portion 4 of the bar 2.

Mounted on the end portion of the base 1 which includes the elements 5 and 6 is a coil spring 11 which encircles the adjacent end portions of the jaws 8 when said jaws are closed. It may be well to here state that the function of the coil spring 11 is to close the jaws 8. The coil spring 11 is engaged beneath a transversely elongated treadle 12 which is slidable on the adjacent end portions of the jaws 8 and through the medium of which said coil spring closes said jaws. The treadle 12 has formed therein an elongated opening or slot 13 which is adapted to receive the jaws 8 as well as the portion 5 of the bar 2 and the vertical portion of the frame extension 6. The end walls of the slot 13 have notches 14 formed therein for the reception of the jaws 8 when the trap is sprung. Mounted on the base extension 6 and the adjacent end portion of the bar 2 and projecting laterally therefrom is a substantially V-shaped rest 15 comprising, on its outer portion, an upstanding flange 16 which is engageable beneath one end portion of the treadle 12.

The transverse bar 3 of the base 1 is provided with an upturned end portion 17 having pivotally mounted thereon for swinging movement in a vertical plane an arm 18. Mounted on the free end portion of the arm 18 is a pan 19. On the pivoted end of the arm 18 is a lug 20 which is engageable with a tooth on one of the jaws 8 for releasably securing said jaws in open position against the compression of the coil spring 11.

It is thought that the operation of the device will be readily apparent from a consideration of the foregoing. Briefly, to set the trap, the feet are placed on the end portions of the treadle 12 and said treadle is pressed firmly downwardly thereby compressing the coil spring 11. The jaws 8 are then spread or opened and a hand is passed under the jaw which is remote from the end portion 17 of the bar 3 for elevating the pan 19 in a manner to engage the lug 20 with the other jaw. The rest 15 with the upstanding flange 16 thereon functions as a stop for one end portion of the treadle 12 when said treadle is depressed. Of course, suitable bait is placed on the pan 19. When an animal, attempting to take the bait, depresses the pan 19 the lug 20 is disengaged from the adjacent jaw 8. The coil spring 11 instantly forces the treadle 12 upwardly, said treadle sliding on the adjacent end portions of the jaws 8 and closing said jaws. It will be observed that the teeth 9 are arranged to depend from the jaws 8 when said jaws are closed. Thus, the teeth 9 function as barbs which prevent the animal after it has been caught from extricating itself from the trap.

It is believed that the many advantages of an animal trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

An animal trap comprising a base including a bar having upturned end portions, said base further including a longitudinal extension on one end of the bar, substantially U-shaped, coacting jaws pivotally mounted on the upturned end portions of the bar, a foot treadle slidable on one end portion of the jaws, a coil spring mounted on the base and engaged beneath the treadle for elevating said treadle for closing the jaws, a substantially V-shaped rest having one end secured to the extension, said rest including a vertical flange on its bight portion engageable beneath one end portion of the treadle for supporting same when said treadle is in lowered position, and animal operated means mounted on the base for releasably securing the jaws in open position against the tension of the spring.

HUBERT W. ADAMS.